United States Patent
Wagner-Stuerz

(10) Patent No.: US 12,098,781 B2
(45) Date of Patent: Sep. 24, 2024

(54) DIAGNOSIS OF POSSIBLE CAUSES OF CHANGES IN A CONTROL VALVE

(71) Applicant: SAMSON AKTIENGESELLSCHAFT, Frankfurt am Main (DE)

(72) Inventor: David Wagner-Stuerz, Muehltal (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 778 days.

(21) Appl. No.: 17/256,556

(22) PCT Filed: Jul. 3, 2019

(86) PCT No.: PCT/EP2019/067871
§ 371 (c)(1),
(2) Date: Dec. 28, 2020

(87) PCT Pub. No.: WO2020/007923
PCT Pub. Date: Jan. 9, 2020

(65) Prior Publication Data
US 2021/0254750 A1 Aug. 19, 2021

(30) Foreign Application Priority Data
Jul. 3, 2018 (DE) .......................... 102018116048.8

(51) Int. Cl.
*F16K 37/00* (2006.01)
(52) U.S. Cl.
CPC ...... *F16K 37/0083* (2013.01); *F16K 37/0041* (2013.01)

(58) Field of Classification Search
CPC .................. F16K 37/0083; F16K 37/0041
(Continued)

(56) References Cited

U.S. PATENT DOCUMENTS

| 4,523,286 A | 6/1985 | Koga et al. |
| 5,549,137 A * | 8/1996 | Lenz ............... G05D 7/005 137/86 |

(Continued)

FOREIGN PATENT DOCUMENTS

| DE | 19723650 A1 | 12/1998 |
| DE | 10344088 A1 | 8/2005 |

(Continued)

OTHER PUBLICATIONS

International Search Report issued in connection with PCT Application No. PCT/EP2019/067871 dated Oct. 16, 2019.

*Primary Examiner* — Aditya S Bhat
(74) *Attorney, Agent, or Firm* — Dennemeyer & Associates LLC

(57) ABSTRACT

A method for diagnosing possible causes of changes in at least one control valve, in a plant of which the control valve is a part, or in a process which is carried out on the plant is proposed, wherein at least in a first and in a second time interval the position of the actuator is detected, an operating point or operating range is determined from the first and from the second time interval, these are compared, and possible causes of changes in the at least one control valve, in the plant or in the process are diagnosed from detected differences. Such a diagnosis does not require any additional sensors and makes it possible to detect emerging problems or undesirable developments solely from the operating state of the valve.

17 Claims, 6 Drawing Sheets

(58) Field of Classification Search
USPC .......................................................... 702/183
See application file for complete search history.

(56) References Cited

U.S. PATENT DOCUMENTS

| | | | |
|---|---|---|---|
| 7,996,096 B2* | 8/2011 | Latwesen | F16K 37/0091 |
| | | | 700/110 |
| 2005/0021298 A1* | 1/2005 | Junk | G05B 23/0229 |
| | | | 702/183 |
| 2016/0169410 A1 | 6/2016 | Wheeler et al. | |

FOREIGN PATENT DOCUMENTS

| | | |
|---|---|---|
| EP | 2792919 A1 | 10/2014 |
| WO | 9506276 A1 | 3/1995 |
| WO | 9716776 A1 | 5/1997 |
| WO | 2011135155 A1 | 11/2011 |
| WO | 2013184863 A1 | 12/2013 |

* cited by examiner ns in a Control Valve

DIAGNOSIS OF POSSIBLE CAUSES OF CHANGES IN A CONTROL VALVE

CROSS-REFERENCE TO RELATED APPLICATIONS

This is a 35 U.S.C. 371 National Stage Patent Application of International Application No. PCT/EP2019/067871, filed Jul. 3, 2019, which claims priority to German application 102018116048.8, filed Jul. 3, 2018, each of which is hereby incorporated by reference in its entirety.

FIELD OF THE INVENTION

The invention relates to a method for diagnosing possible causes of changes in at least one control valve with a control element, in a plant of which the control valve is part, or in a process performed on the plant, and to a control valve with corresponding means.

Control valves, also known as process valves, consist of a movable control element or valve member and an opening in the valve body. The valve element is able to either partially or completely open or close this opening.

Optimizing the operation and maintenance of these valves, as well as the early detection of possible malfunctions or incorrect design of such valves are very important in practice.

PRIOR ART

The publication EP 315 391 B1 describes several scanning systems in which samples are compared with reference values in order to determine deviations in operation of a valve. The disadvantage of this method is that either additional force sensors or additional scanning devices are required in order to determine whether the valve is worn. The operating point of the valve is not taken into account.

In EP 2 884 358 B1, a control system for a complete plant is described, which uses process data and relates them to normal values. Operating points or operating ranges of the individual valves involved are not evaluated, instead, a complex system control is essentially described.

Problem

The purpose of the invention is to specify methods and devices for diagnosing possible causes of changes in at least one control valve, a plant of which the control valve is a part, or a process, which do not require additional sensors or scanning devices.

Solution

This problem is solved by the subjects of the independent claims. Advantageous developments of the subjects of independent claims are characterized in the dependent claims. The wording of all claims is hereby incorporated in the content of this description by reference.

The use of the singular shall not exclude the plural, which shall also apply in the reverse sense, unless the contrary is disclosed.

Individual method steps will be described in greater detail hereinafter. The steps do not necessarily have to be performed in the specified order, and the method to be described can also comprise further steps which are not mentioned.

In order to solve the problem, a method is proposed for diagnosing possible causes of changes in at least one control valve with a control element, in a plant of which the control valve is a part, or in a process performed on the plant. The procedure comprises the following steps:

When the control element is not moving, i.e. especially if no movement is intended and no control pulse is present, data concerning the position of the control element are recorded at a plurality of times. These data can be, for example, the exact position of the control element or the status of the associated controller as well as the corresponding point in time. These data are recorded at least in a first and in a second time interval, typically in regular time intervals. Characteristics of the data from the first time interval are determined. These can be, for example, the operating point, a mean value, its variance, an operating range, or, if available, local maxima. For investigation of the operating point or operating range it is of special interest whether an accumulation of the data can be determined. The same characteristics are determined for the data from the second time interval. Then the characteristics of the data from the two time intervals are compared in order to detect changes. These changes may be, in particular, changes of the operating point or the valve cone or the valve seat. From differences determined in the characteristics, possible causes for changes in the at least one control valve, in the plant or in the process, are diagnosed, and this diagnosis is output.

In this way, without additional sensors or complicated monitoring systems, it is easy to detect whether the state of the process or the control valve changes and, in particular, to derive a diagnosis from this change, which allows to react to emerging problems or undesirable developments in advance or proactively.

Naturally, it is sensible to check the diagnosis at the plant and/or the control valve in an additional step.

For a meaningful evaluation of the data, especially with regard to the operating point or operating range of the control valve, it is helpful if the data concerning the position of the control element is rejected and not recorded if the corresponding position of the control element corresponds to 0% or 100%. This corresponds to the respective closed and fully opened valve position, which naturally have nothing to do with the operating point of the valve.

The evaluation of the data is also facilitated if the further steps are only performed if for each time interval considered the characteristics of the data from the time interval considered include that at least one local maximum can be assigned. Only then is it possible to determine the operating point or operating range without great uncertainty and/or great effort.

By checking differences determined in the characteristics of the data from the two time intervals for their significance, it can be ensured that the diagnosis is based on real effects. False alarms and nonsensical diagnoses can thus be suppressed.

The diagnosis becomes particularly meaningful if an operating point and/or an operating range of the control valve is determined from the characteristics of the data for each time interval considered.

An incorrect sizing of the control valve size can be diagnosed if the operating point does not correspond to a valve position between 50% and 70%. This is because control valves operate most effectively at a position of approximately 70%. For safety reasons, a certain oversizing of the valves is often desired.

A change in the process or a change in the fluid controlled by the valve can be diagnosed if differences in the characteristics of the data between two time intervals are determined, the time intervals being separated by no more than two weeks, preferably one week, particularly preferably 96 hours, most preferably 48 hours. Such changes are to be considered short-term and can essentially not have been caused by wear and tear.

Wear or a defect in the valve can be diagnosed if differences in the characteristics of the data of two time intervals are determined only if the time intervals are more than 3 weeks, preferably more than 2 months, especially preferably more than 6 months, most preferably more than a year apart. Such changes are long-term in nature and therefore do not correspond to process changes.

Deposits on the valve seat or valve cone can be diagnosed if the operating point and/or operating range is shifted to a more open valve position. Such deposits reduce the flow through the valve.

Wear or abrasion of the valve seat and/or valve cone can be diagnosed if the operating point and/or operating range is shifted to a more closed valve position. Such wear increases the flow through the valve.

If not merely an operating point, but an operating range with a width is determined, a decrease in the stability of the process can be diagnosed from an increase in the width of this operating range, and/or an increase in the stability of the process can correspondingly be diagnosed from a decrease in the width of the operating range.

If a diagnosis of possible causes for changes in a plant or process having a plurality of valves is provided, a defect in a pump can be diagnosed if the operating point and/or operating range of a plurality of valves that interact with the pump is shifted to a more open valve position. In this case, the flow rate is commonly lower than expected for this plurality of valves, which argues against a cause at a single one of these valves.

A particularly favorable method for determining the operating range of the control valve results from performing the following steps in the considered time interval: A histogram is formed from the data concerning the position of the control element. The local maximum of the frequencies of the position of the control element in this histogram is determined and assigned to the operating range. As long as the frequency assigned to the operating range is less than 50% of the total frequency, the position of the control element with the highest frequency directly adjacent to the operating range in the histogram is added to the operating range. This obtains the range surrounding the local maximum in which at least 50% of all position data of the control element are located. There is thus not merely a local maximum at a sharp position, but a continuous range with a certain width, which comprises those positions in which the control element of the control valve is most frequently located.

The problem is further solved by a control valve having means for performing a method as described above.

The problem is also solved by a control valve, with means for acquiring data on the position of the control element and the associated time, said means being so configured that they can acquire data on the position of the control element and the associated time when the control element is not moving. Further having means for determining time intervals, said means being able to determine at least a first and a second time interval, and wherein data on the position of the control element and the respective associated time are acquired in the at least first and second time intervals. Further with means for determining and comparing characteristics of data from time intervals, said means being configured to determine and compare the same characteristics of data from said first and second time intervals. Further comprising means for establishing and issuing a diagnosis; said means being capable of establishing and issuing a diagnosis if said means for determining and comparing characteristics of data detect differences in the characteristics of the data from the first and second time intervals.

The control valve is designed especially simply and securely (e.g. with regard to network security) if a control module is present, wherein the means for acquiring data, for determining time intervals, for determining and comparing characteristics of data, and for establishing and issuing a diagnosis are provided by the control module.

Centralized monitoring, and a comparatively little effort for possibly required complex calculations and/or analyses of the data is achieved if the control valve has a control module, wherein the means for acquiring data, for determining time intervals, for determining and comparing characteristics of data, and for establishing and issuing a diagnosis are provided by at least one device which is connected to the control module via a network. The at least one device can be a computer in a cloud, for example.

The problem is also solved by a method as described above, wherein the method steps are formulated as program code with which the method can run on at least one computer.

The problem is further solved by a computer program, which contains executable instructions which, when executed on a computing unit, a microcontroller, DSP, FPGA or computer or on a plurality thereof in a network, performs the method according to one of the preceding method claims.

Furthermore, the problem is solved by a computer program with program code means for performing the method according to the invention in one of its embodiments if the program is executed on a computing unit, a microcontroller, DSP, FPGA or computer or on a plurality thereof in a network. In particular, the program code means may be instructions stored on a computer-readable data carrier.

In addition, the problem is solved by a data carrier on which a data structure is stored which, after being loaded into a working and/or main memory of a computing unit, a microcontroller, DSP, FPGA or computer or a plurality thereof in a network, can perform the method according to the invention in one of its embodiments.

The problem is also solved by a computer program product having program code means stored on a machine-readable carrier in order to perform the method according to the invention in one of its embodiments if the program is executed on a computing unit, a microcontroller, DSP, FPGA or computer or on a plurality thereof in a network. A computer program product is thereby understood to be the program as a tradable product. In principle, it can exist in any form, for example on paper or a computer-readable data carrier, and it can in particular be distributed via a data transmission network.

Finally, the problem is solved by a modulated data signal containing instructions executable by a computing unit, a microcontroller, DSP, FPGA or computer or by a plurality thereof in a network for performing the method according to the invention in one of its embodiments.

The computer system for performing the method can be a either a single computer or microcontroller, DSP or FPGA, or a network of microcontrollers, DSPs, FPGAs or computers, for example a closed network within a company or computers connected to each other via the Internet. Furthermore, the computer system can be realized by a client-server constellation, wherein parts of the invention run on the server, others on a client.

Additionally, the problem is solved by a control module for a control valve, which provides means for performing the described method. With such a control module, already existing control valves can be retrofitted according to the invention.

BRIEF DESCRIPTION OF THE DRAWINGS

Further details and features will emerge from the following description of preferred exemplary embodiments in conjunction with the dependent claims. Here, the respective features can be implemented individually or in combination with one another. The possibilities for solving the problem are not limited to the exemplary embodiments. For example, specified ranges thus always comprise all—not stated—intermediate values and all conceivable sub-ranges.

The exemplary embodiments are shown schematically in the figures. Identical reference signs in the individual figures denote identical or functionally identical elements or elements that correspond to one another with respect to their function. Individually.

DETAILED DESCRIPTION

Figure 1A:
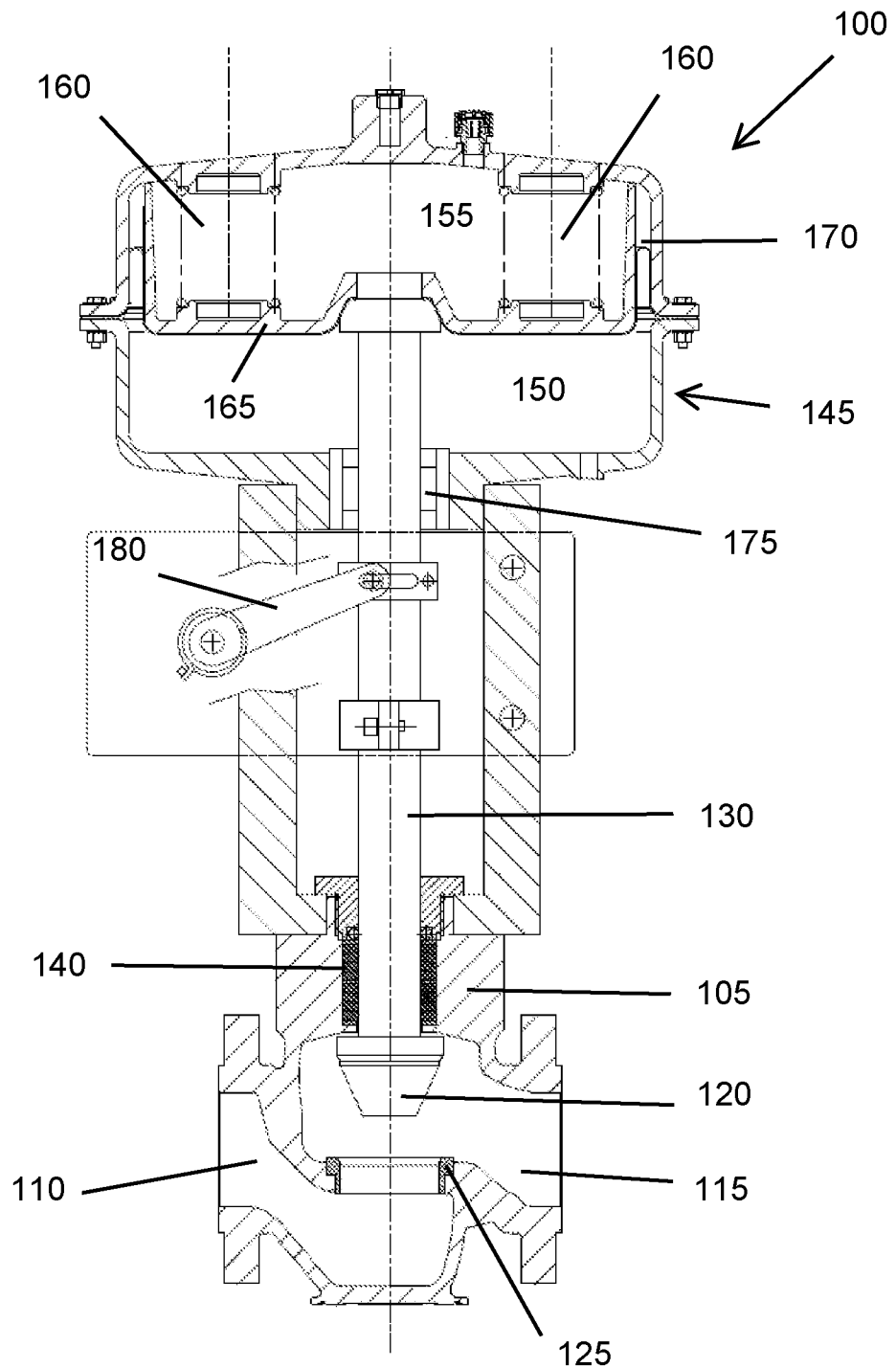
FIG. 1A shows the typical design of a control valve in open position.

FIG. 1A shows a typical design of a control valve 100 with a valve body 105. Between the inlet 110 and the outlet 115 there is a valve member 120 which can be pressed into the valve seat 125 to restrict the flow of a process fluid flowing from the inlet 110 to the outlet 115. The passage of the valve stem 130 through the fluid-tight valve housing 105 is sealed by a seal or gland 140.

At the top of the valve stem 130 is a fluidic actuator 145, where the actuator fluid is typically gas. The actuator 145 has two chambers, a lower compressed air chamber 150 and an upper chamber 155, in which springs 160 act on the valve stem 130 via a plate 165. The two chambers 150 and 155 are separated by a diaphragm 170, which is impermeable to the actuator fluid, typically compressed air. Such a design is referred to as single-acting pneumatic actuator, since compressed air is only introduced into one chamber, the compressed air chamber 150, and not into both. The passage of the valve stem 130 through the housing of the actuator 145 must be sealed against the actuator fluid. For this purpose, this passage is sealed by an actuator housing seal 175.

Typically, the valve stem 130 is equipped with a signal transmitter or position sensor 180 to determine the position of the valve member 120.

In FIG. 1A there is sufficient compressed air in the compressed air chamber 150 so that the control valve 100 is open.

Figure 1B:
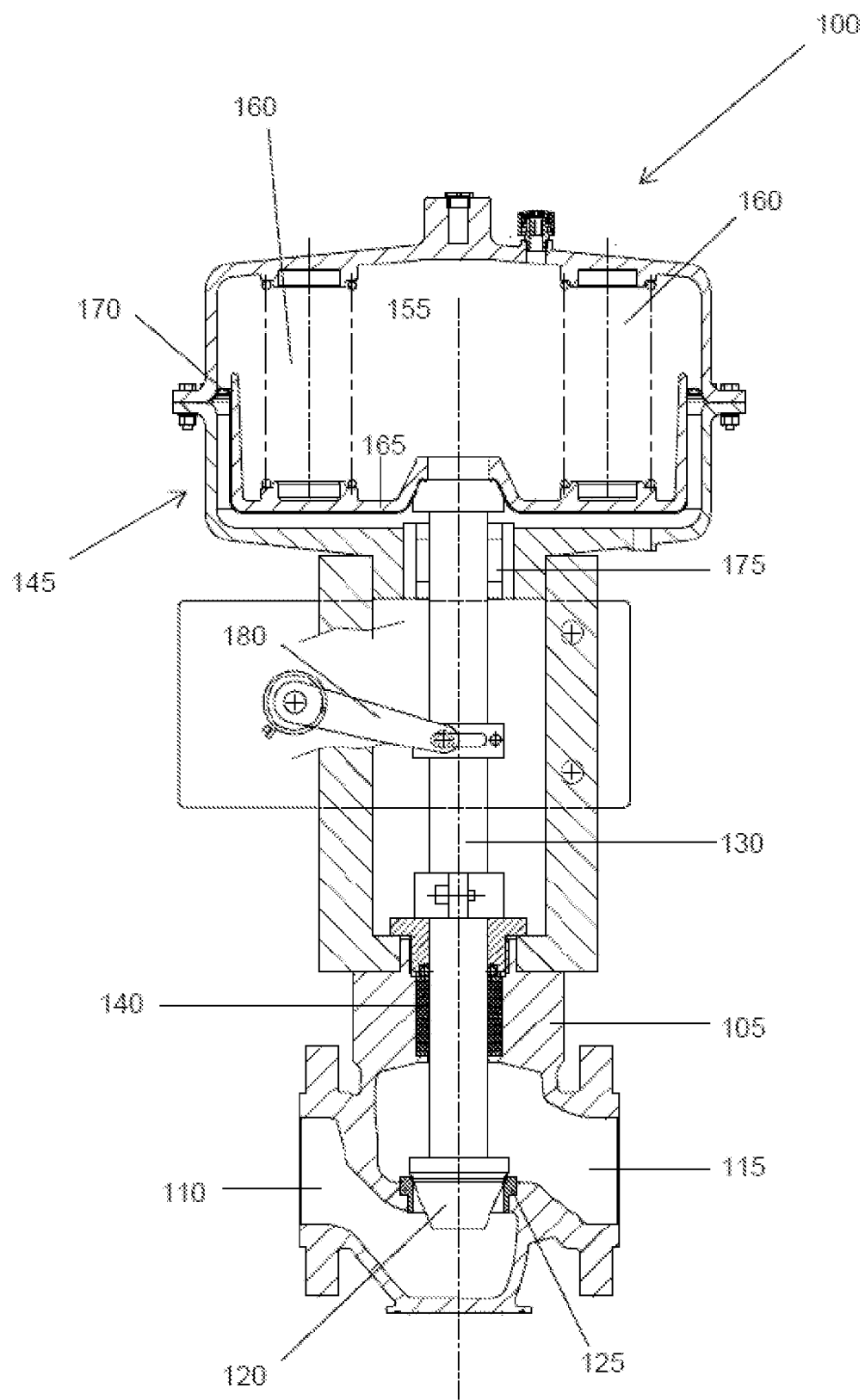
FIG. 1B shows the typical design of a control valve in closed position.

In FIG. 1B the compressed air chamber 150 was vented so that the springs 160 could close the control valve 160.

The determination of the operating point or operating range is preferably based on the evaluation of the histogram of the valve position. The histogram is analyzed for accumulations. Typical histograms of this type are shown in FIGS. 2A, 2B, 3A and 3B. For evaluation, it is advisable to cut off the border areas (i.e. those data which correspond to 0% or 100%, as the valve is then completely closed or open).

In order to obtain the operating range, it is preferable to start from the highest column of the histogram (with the exception of 0% and 100%), i.e. the local frequency maximum. Then, if appropriate, neighboring columns are added until a certain percentage of the total frequency is reached, e.g. 50%. Then the valve operates in this range for at least 50% of the time. In a typical procedure, the adjacent column of the histogram which respectively has the higher frequency is always added to the operating range.

Of course, other procedures are also conceivable, e.g. both adjacent columns can be added until the desired frequency is reached. Or the mean value+/−one or more standard deviations may be defined as the operating range.

The histograms can be used to identify various changes in the operating range, which can result in different diagnoses.

Figure 2A:
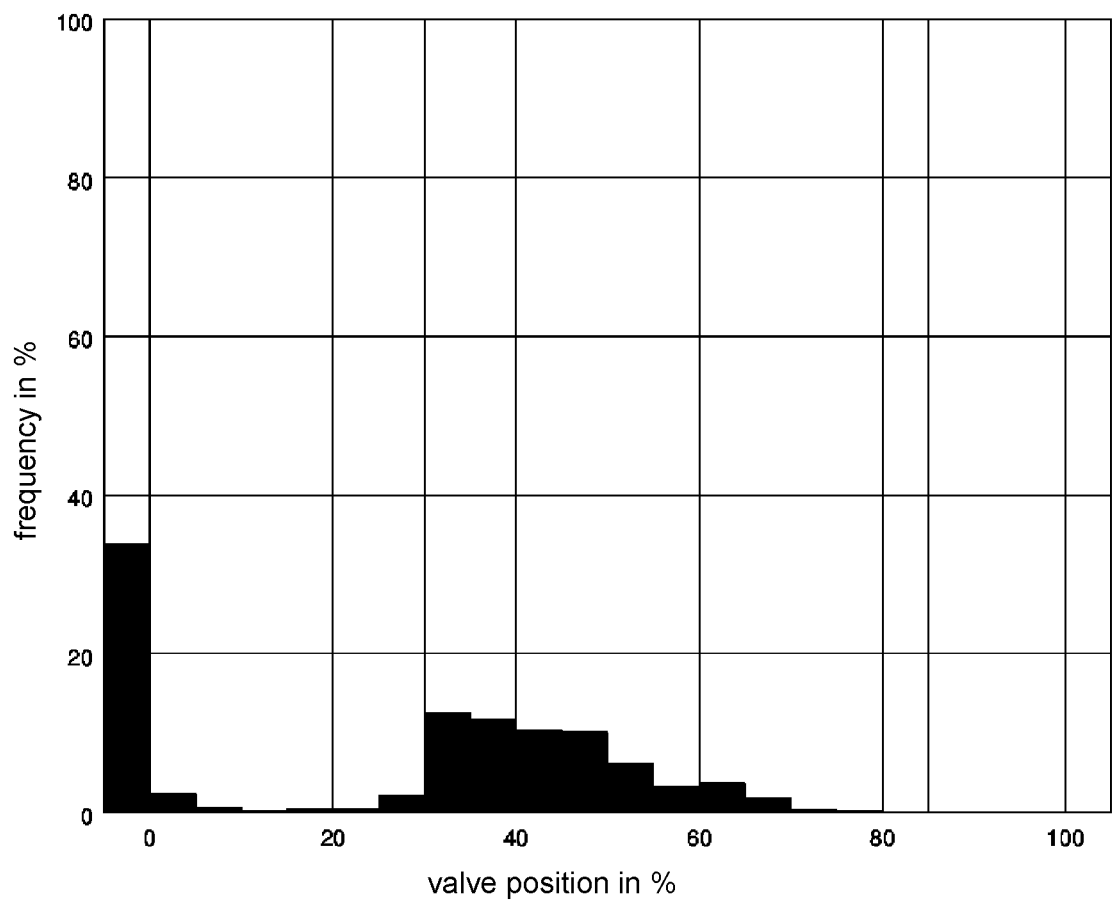
FIG. 2A shows a typical histogram of the valve position, in which the control valve can be recognized as oversized based on the operating range.

For example, FIG. 2A clearly shows that the operating range is around 40% rather than in the optimum range of 60-70%. This allows the conclusion that the control valve is oversized for the process that takes place there, as it normally does not open as far as would be appropriate to achieve maximum efficiency in operating the valve.

For further evaluation it is useful to distinguish between short-term and long-term changes. Long-term changes can extend over several months, years or even over the entire lifetime of the plant or valve. Short-term changes, on the other hand, can range from hours, a few days to a maximum of weeks. Depending on whether the changes are short- or long-term, it can be assumed that they are due to process changes or, for example, changes in the composition of the fluid to be controlled (short-term), or, for example, to wear and tear at the valve (long-term).

Figure 2B:
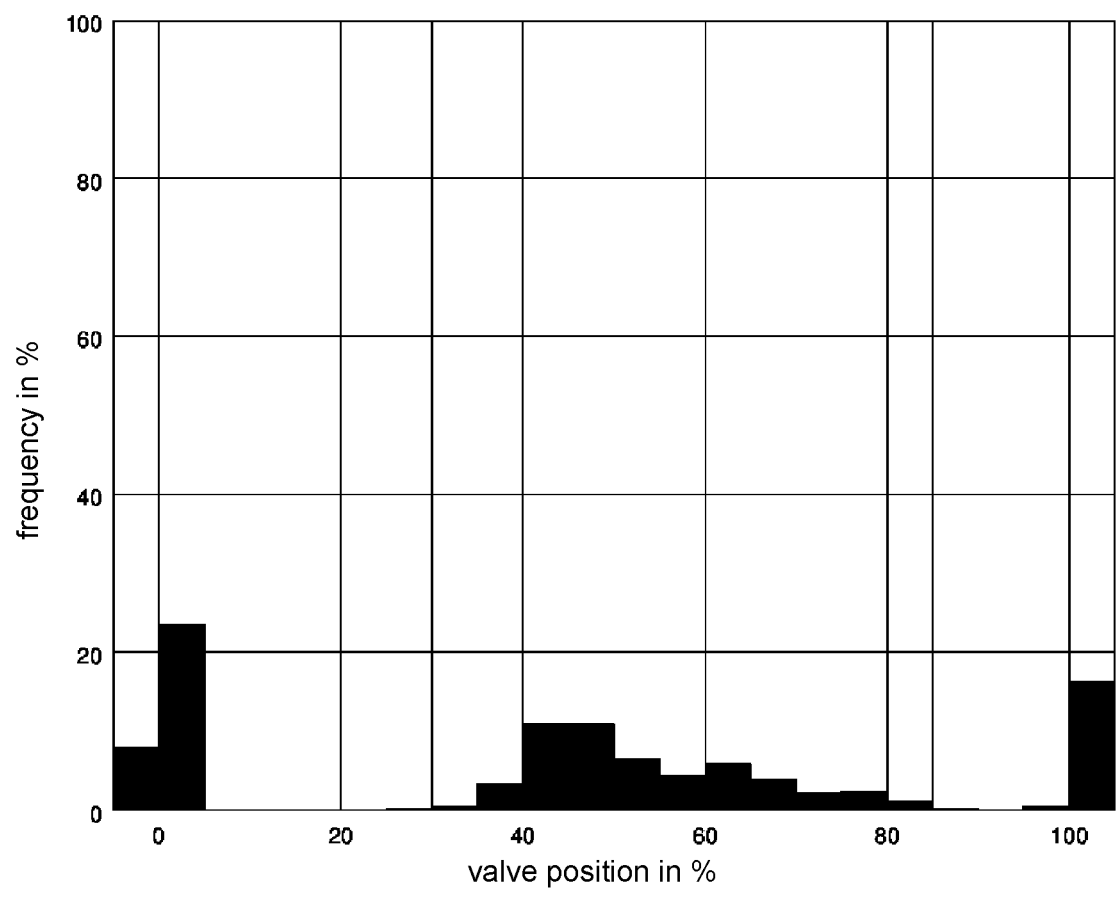
FIG. 2B shows a histogram of the valve position, in which the operating range is shifted towards the more open state compared to FIG. 2A.

At the transition from FIG. 2A to FIG. 2B it can be seen that the operating range in FIG. 2B is shifted towards the more opened state. If this is a long-term effect, deposits on the valve seat or valve cone, for example, should be diagnosed.

On the other hand, if the effect is short.term, and possibly also occurs at other valves located downstream in the process, a possibly defective pump (which delivers less than expected) could be diagnosed in the flow area of the valve.

Figure 3A:
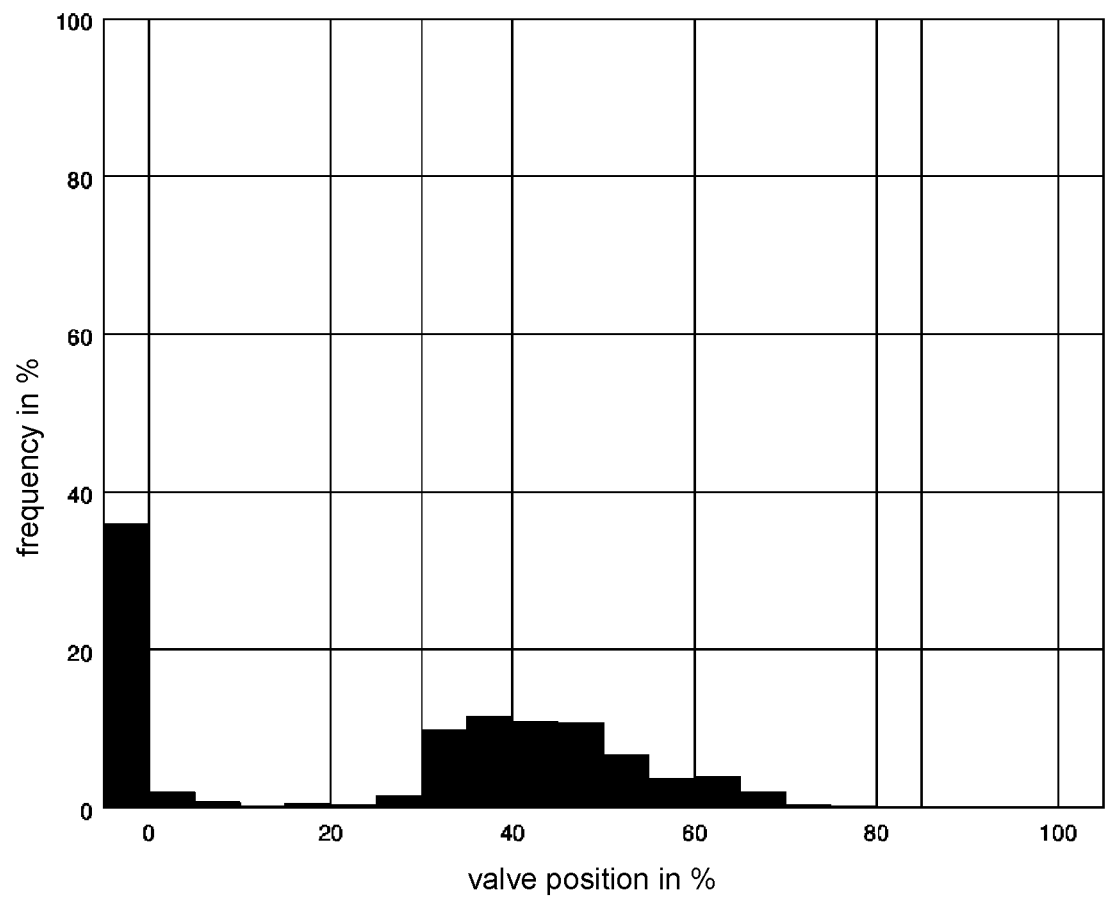
FIG. 3A shows another typical histogram of a valve position.
Figure 3B:
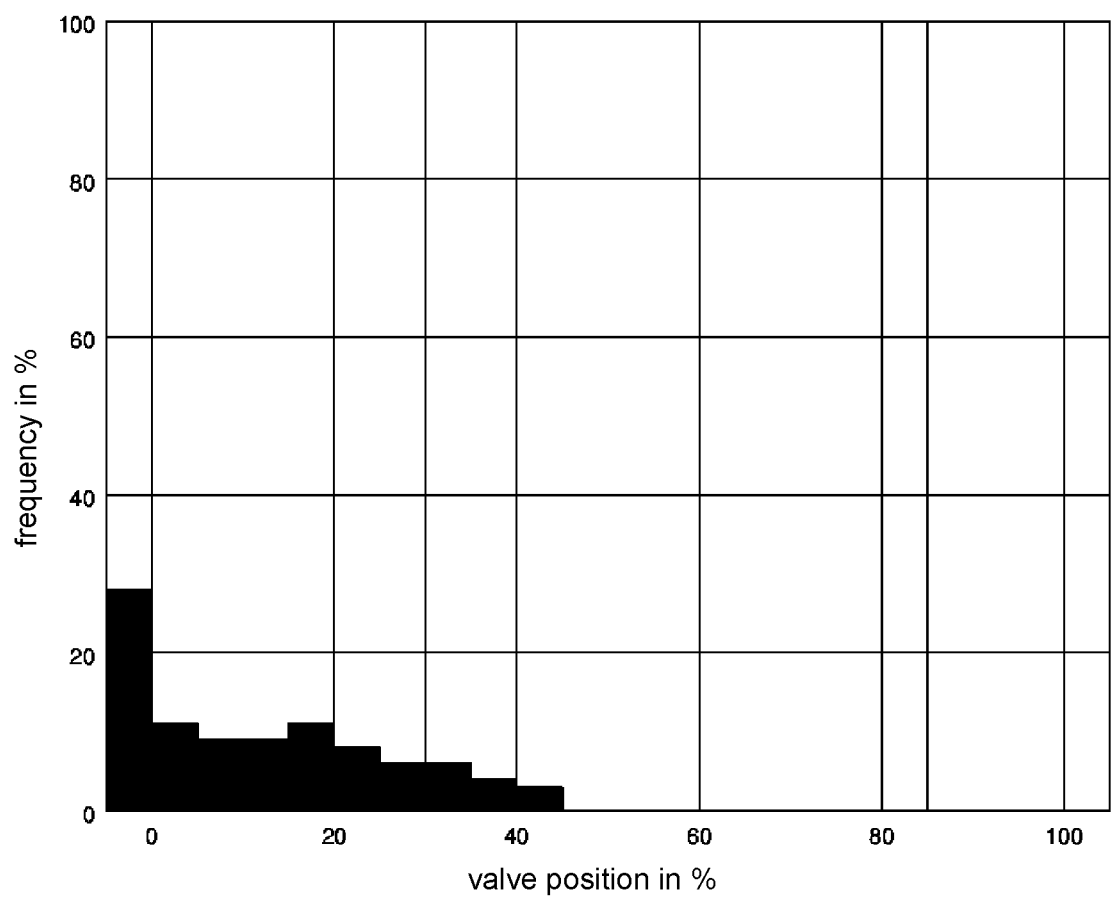
FIG. 3B shows a histogram of the valve position in which the operating range is shifted strongly towards the more closed state compared to FIG. 3A.

At the transition from FIG. 3A to FIG. 3B it can be seen that the operating range is shifted strongly towards the more closed state. If this is a long-term effect, wear of the valve seat or valve cone could be diagnosed.

Due to the strength of the shift, however, it can be assumed that process changes may also play a role here. In case of a short-term change of this kind, this would also be the applicable diagnosis.

Furthermore, changes in the width of the operating range are relevant. If the operating range broadens, a reduction in process stability is to be determined. If the operating range becomes narrower, however, the process apparently runs more stably.

With these rules, knowledge of the rest positions of the control valve alone is sufficient to diagnose problems that may occur and cause changes to the control valve. Based on these diagnoses, it is possible, for example, to intervene with maintenance measures before damage or failures occur in the plant. And no additional sensors are required for these diagnoses.

Glossary

Operating Range

This designates a range or interval that contains the operating point. This is always useful if an operating point cannot be precisely determined, e.g. because the position resolution of the available data is too low or the state being recorded fluctuates too strongly. Such an operating range can be defined e.g. by the requirement that 50% of the values must be included.

Operating Point

The operating point, also called operating state, is a certain point in the characteristic diagram or on the characteristic curve of a technical device, which is taken due to the system characteristics and external influences and parameters (according to https://de.wikipedia.org/wiki/Arbeitspunkt). In the case of a control valve, this is the opening condition intended during normal operation. Control valves are typically designed so that the operating point is at an optimum at 70% opening.

Process Valve, Control Valve

Process valves, also known as control valves, are used to throttle or regulate fluid flows. For this purpose, a throttle body or valve member is moved in a flow opening of a valve seat by means of a drive.

REFERENCE NUMERALS

- 100 control or process valve
- 105 valve body
- 110 inlet
- 115 outlet
- 120 valve member
- 125 valve seat
- 130 valve stem
- 140 seal or gland
- 145 fluidic actuator
- 150 compressed air chamber
- 155 upper chamber
- 160 spring
- 165 plate
- 170 diaphragm
- 175 actuator housing seal
- 180 signal transmitter

CITED LITERATURE

Cited Patent Literature

EP 315 391 B1
EP 2 884 358 B1

The invention claimed is:

1. A method for diagnosing possible causes of changes in a control valve with a movable control element or valve member, comprising the following steps performed by a control module or computer:
   - recording data concerning a position of the movable control element or valve member at a plurality of times, when the movable control element or valve member is not moving;
   - causing the recording to occur at least in a first and in a second time interval;
   - selecting characteristics of the data concerning the position of the movable control element or valve member from a group comprising at least an operating point, a mean value, a variance of a mean value, an operating range, local maxima;
   - determining said characteristics of the data concerning the position of the movable control element or valve member from the first time interval;
   - determining the same characteristics of the data from the second time interval;
   - comparing the characteristics of the data concerning the position of the movable control element or valve member from the first and the second time intervals;
   - diagnosing possible causes for changes in the at least one control valve from differences determined in the characteristics of the data from the first and the second time intervals, wherein said diagnosing comprises at least one of:
   - diagnosing an incorrect sizing of the control valve size if the operating point does not correspond to a position of the movable control element or valve member between 50% and 70%;
   - diagnosing a change in a process or a change in a fluid controlled by the process if differences in the characteristics of the data between two time intervals are determined, wherein the time intervals are not more than 2 weeks apart;
   - diagnosing wear or s defect in the control valve if differences in the characteristics of the data of two time intervals are determined only if the time intervals are more than 3 weeks apart;
   - diagnosing deposits on a valve seat or a valve cone if the operating point and/or operating range is shifted towards a more open valve position;
   - outputting the diagnosis for review;
   - if wear or a defect in the control valve or deposits on a valve seat or a valve cone are diagnosed, intervening with maintenance measures for the control valve.

2. The method according to claim 1 including the step of:
   checking the diagnosis at the control valve.

3. The method according claim 1, including the step of:
   rejecting and not recording the data concerning the position of the movable control element or valve member if the corresponding position of the movable control element or valve member corresponds to either 0% or 100%.

4. The method according to claim 1, comprising only performing the further steps if for each time interval considered the characteristics of the data from the time interval considered include that at least one local maximum can be assigned.

5. The method according to claim 1, including the step of:
   checking differences determined in the characteristics of the data from the two time intervals for their significance.

6. The method according to claim 1, including the step of:
   determining an operating point and/or an operating range of the control valve from the characteristics of the data for each time interval considered.

7. The method according to claim 6, including the step of:
   diagnosing wear or abrasion of a valve seat and/or a valve cone if a difference is determined in that the operating point and/or operating range is shifted towards a more closed valve position.

8. The method according to claim 6, wherein an operating range with a width is determined, including the steps of:
   diagnosing a decrease in the stability of a process from a increase in the width of the operating range, and/or diagnosing an increase in the stability of the process from a decrease in the width of the operating range.

9. The method according to claim 6, wherein the following steps are performed to determine the operating range of the control valve in the considered time interval:
   forming a histogram from the data concerning the position of the movable control element or valve member;
   determining a local maximum of frequencies of the position of the movable control element or valve member in this histogram and assigning the local maximum to the operating range;
   adding the position of the movable control element or valve member with the highest frequency directly adjacent to the operating range in the histogram to the operating range as long as the frequency assigned to the operating range is less than 50% of the total frequency.

10. The method according to claim 1, providing a diagnosis of possible causes of changes in a plant or process having a plurality of valves, including the step of:
   diagnosing a defect in a pump if a difference is determined in that, for a plurality of valves interacting with the pump, the operating point and/or operating range is shifted to a more open valve position.

11. A control valve having means for performing a method according to claim 1.

12. A control valve, having:
   means for acquiring data on a position of a movable control element or valve member and an associated time, said means being configured to acquire data on a position of the movable control element or valve member and the associated time when the movable control element or valve member is not moving;
   means for determining time intervals, said means being able to determine at least a first time interval and a second time interval;
   wherein data on the position of the movable control element or valve member and the respective associated time are acquired in the at least first and second time intervals; and with
   means for determining and comparing characteristics of data from first and second time intervals, said means being configured to determine and compare the same characteristics of data from said first and second time intervals; and
   wherein said characteristics are selected from a group comprising at least an operating point, a mean value, a variance of a mean value, an operating range, local maxima;
   means for establishing and issuing a diagnosis; said means being capable of establishing and issuing a diagnosis if said means for determining and comparing characteristics of data detect differences in the characteristics of the data from the first and second time intervals;
   wherein said means are configured to perform the method according to claim 1.

13. The control valve according to claim 12, further including
   a control module;
   wherein the means for acquiring data, for determining time intervals, for determining and comparing characteristics of data, and for establishing and issuing a diagnosis are provided by the control module.

14. The control valve according to claim 12, further including
   a control module;
   wherein the means for acquiring data, for determining time intervals, for determining and comparing characteristics of data, and for establishing and issuing a diagnosis are provided by at least one device connected to the control module via a network.

15. The method according claim 1, wherein the method steps are formulated as program code, with which the method can be run on at least one computer.

16. A non-transitory computer readable medium containing computer instructions stored therein for causing a computer processor to perform the method according to claim 1.

17. A control module for a control valve, wherein the control module provides means to perform the method according to claim 1.

* * * * *